United States Patent [19]

Wallenfang

[11] 4,143,757
[45] Mar. 13, 1979

[54] SELF-CLEANING SPROCKET ASSEMBLY

[75] Inventor: Jerome A. Wallenfang, Appleton, Wis.

[73] Assignee: Koehring Company, Brookfield, Wis.

[21] Appl. No.: 844,422

[22] Filed: Oct. 18, 1977

Related U.S. Application Data

[63] Continuation of Ser. No. 713,838, Aug. 12, 1976, abandoned.

[51] Int. Cl.² .................... B65G 45/00; F16H 55/30; A10D 45/02
[52] U.S. Cl. ................................. 198/494; 56/98; 74/230; 74/243 C; 198/842
[58] Field of Search ............ 198/494, 497, 499, 842, 198/834; 74/230, 230.11, 243 R, 243 C; 56/98; 308/36.1, 36.2, 187, 187.1

[56] References Cited

U.S. PATENT DOCUMENTS

| 1,937,304 | 11/1933 | Worrall | 74/243 C |
|---|---|---|---|
| 2,443,947 | 6/1948 | Brooks et al. | 74/243 R |
| 3,068,711 | 12/1962 | Even | 74/243 C |
| 3,144,280 | 8/1964 | Sorenson | 308/36.1 |
| 3,765,258 | 10/1973 | Jespersen | 74/243 R |
| 3,940,913 | 3/1976 | Wallenfang | 56/98 |
| 3,961,466 | 6/1976 | Martin et al. | 56/98 |
| 4,072,062 | 2/1978 | Morling et al. | 74/243 R |
| 4,086,748 | 5/1978 | Witt | 56/98 |

FOREIGN PATENT DOCUMENTS

| 1292986 | 4/1969 | Fed. Rep. of Germany | 74/243 C |
| 1198059 | 12/1959 | France | 198/494 |

Primary Examiner—Joseph E. Valenza
Attorney, Agent, or Firm—Finnegan, Henderson, Farabow & Garrett

[57] ABSTRACT

A sprocket assembly adapted for rotational cooperation with a flexible, toothed driving belt and used in a crop handling device such as a forage harvester or the like is constructed of a pair of parallel sidewall members or disks which are interconnected by a central hub rotatable about a center axis. The outer surface of the hub is contoured so as to include a middle section of reduced diameter together with additional sections of generally conical configuration extending away from the middle section toward the sidewalls. Sets of drive lugs are provided on the inner surfaces of each of the sidewalls and arranged in a circular pattern so as to cooperate with the teeth of the drive belt. A stationary wiper arm is mounted adjacent to the rotatable hub and includes a portion extending into the space between the sidewalls and between the two sets of drive lugs such that an end portion of the wiper arm is positioned in close proximity to the middle section of the hub. Foreign material carried into the sprocket assembly by the drive belt winds about the hub surface and is channelled by the conical sections thereof toward the middle section whereupon the wiper arm disintegrates the material and ejects it from the assembly.

14 Claims, 4 Drawing Figures

4,143,757

SELF-CLEANING SPROCKET ASSEMBLY

This is a continuation of application Ser. No. 713,838, filed Aug. 12, 1976 now abandoned.

FIELD OF THE INVENTION

The present invention pertains to a self-cleaning sprocket assembly and, more particularly, to a sprocket assembly that is well suited for use in equipment such as farm machinery wherein chain or belt-type drives are required to operate in an environment where large amounts of foreign material such as crop cuttings and the like are likely to become entangled to the sprocket mechanism and cause jamming or breaking of the drive train.

BACKGROUND OF THE INVENTION

The problems connected with accumulation of foreign material in drive mechanism employed with various types of farm machinery are as old as the technology of farm machinery itself. The problem has been particularly vexing insofar as chain and belt-type sprocket drives are concerned since these types of mechanism are used in applications frequently involving direct exposure to foreign matter such as cuttings, weeds and the like. For example, in a crop harvesting apparatus a set of sprocket-entrained conveyor belts may be employed to gather cuttings such as stalks and transport them to processing stations.

It has been a practice of the prior art to attempt to provide a self-cleaning action for sprocket drives by utilizing a plurality of wiper bars or fingers mounted adjacent to the sprocket gear and extending to a point in close proximity to the sprocket hub whereupon material which becomes wrapped about the hub is stripped away.

A problem with such prior arrangements has been that for a drive comprising a single sprocket gear at least two wiper arms are required, one to clean the hub on each side of the gear. In the case of a drive employing compound sprockets, still additional wiper arms are required to clean the hub sections between the several sprocket gears as well as to clean the hub sections on the outer ends of the gear.

Such multiple wiper arm configurations are bothersome from a replacement and repair standpoint since the support mechanism for the arms tend to be complicated, making it difficult to remove and replace a broken arm, particularly if the broken arm happens to be the center one of a three-arm arrangement. Furthermore, the several arms quite often, of necessity, have different shapes whereupon it becomes necessary to maintain a stock of several different types of replacement parts.

Furthermore, the necessary clearance space required between the sides of the wiper arms and the adjacent sides of the sprocket gear or gears leaves a gap in which thin strands of foreign material such as straw, string and the like can collect and possibly build up to the point of interfering with the rotation of the mechanism.

OBJECTS AND SUMMARY OF THE INVENTION

It is accordingly an object of the invention to provide an improved self-cleaning rotary member for use in a crop handling device in cooperation with an endless drive belt, chain or the like.

Another object is to provide an improved self-cleaning sprocket assembly.

A further object is to provide a sprocket assembly of the type described wherein only a single wiper arm is required, even though the drive employs the equivalent of a compound drive sprocket.

Still another object is to provide a sprocket assembly of the type described wherein the use of entirely cylindrical hub sections capable of accumulating foreign material is avoided.

Still a further object is to provide a sprocket assembly of the type described which is suited for use with a broad, flexible, lugged drive belt or chain fabricated of rubber composition or plastic material or in the form of a rubber coated chain or the like.

Additional objects and advantages of the invention will be set forth in part in the description that follows, and in part will be apparent from the description, or may be learned by practice of the invention. The objects and advantages of the invention may be realized and attained by means of the instrumentalities and combinations particularly pointed out in the appended claims.

To achieve the foregoing objects and in accordance with one aspect of the invention, a rotary assembly adapted for use in a crop handling device is provided with a pair of parallel sidewalls interconnected by a central hub, the surface of which is contoured so as to include a middle section of reduced diameter and additional sections of increasing diameter which flare away from the middle section toward the sidewalls. A plurality of drive lugs or tangs are provided on the opposed inner surfaces of the sidewalls or extend from the end portions of the flared hub surfaces and are arranged so as to drivingly engage a flexible driving member such as a belt or a chain.

In accordance with a further aspect of the invention, a rotatable assembly for use in a crop handling device is provided with a central hub contoured as described above and arranged to cooperate with wiping means mounted adjacent to the rotatable assembly and including an arm extending into the space between the sidewalls and terminating in an end portion positioned in close proximity to the middle section of the hub so that rotation of the assembly operates to cause foreign material to collect in the open area between the sidewalls, whereupon the flared sections of the hub surface channel the foreign material to the middle section thereof so it is disintegrated and ejected by the wiper arm.

These and other objects, features and advantages will be made apparent by the following description of the preferred embodiment of the invention, the description being supplemented by drawings as follows.

DESCRIPTION OF THE PREFERRED EMBODIMENT

Figure 1:
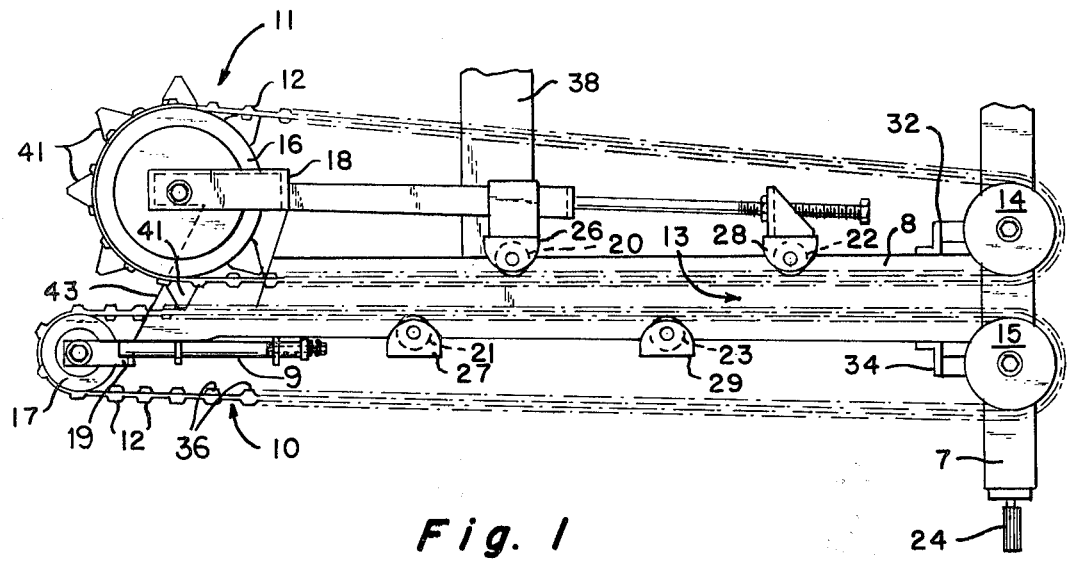
FIG. 1 is a plan view of a conveying mechanism for a row crop harvesting system, illustrating one exemplary application for the self-cleaning sprocket apparatus of the invention.

Referring to FIG. 1, there is shown a system which illustrates one exemplary application for the self-cleaning sprocket of the invention. FIG. 1 shows a header attachment for a row crop harvesting apparatus such as is more fully shown and described in U.S. Pat. No. 3,940,913 entitled "Row Crop Harvesting Apparatus" issued on Mar. 2, 1976 to J. A. Wallenfang and W. E. Witt. The apparatus includes a pair of lugged conveyor belts 10 and 11 entrained on sprocket wheels 15, 17 and 14, 16, respectively. Frame members 7, 8 and 38 support the arrangement in the manner shown such the belts 10 and 11 are disposed on either side of a central feed channel 13.

Sprockets 14 and 15 are geared to a conventional source of drive power (not shown) through a drive shaft 24 whereby sprockets 14 and 15 impart a positive driving action to the belts. A set of outer lugs 12 disposed on the belts gather in crop material at the inlet (left-hand) side of the apparatus and convey it to the outlet (right-hand) side where it is delivered to a crop processing apparatus such as a reducer or chopper (not shown).

Idler sprockets 16 and 17 are mounted for rotation in a pair of clevises 18 and 19, respectively. Sprocket 16 is arranged to drive a set of sickle blades 41 which cooperate with stationary knife edge 43 to sever crop material as it enters the conveyor channel 13.

As shown in FIG. 1, sets of bogey rolls 20, 21, 22 and 23 are rotatably supported in brackets 26, 27, 28 and 29 and serve to provide back-up support to belts 10 and 11 along the length of the conveyor channel. The apparatus additionally includes a pair of stationary wiper arms 32 and 34 which are arranged, as described in detail hereinbelow, to provide a wiping or cleaning action to eject foreign material from the sprockets 14 and 15.

Also, the inside surfaces of belts 10 and 11 are provided with transverse lugs 36 which cooperate with lugs or tangs on the sprockets to provide positive driving engagement in a manner also to be described in detail hereinbelow.

Figure 2:
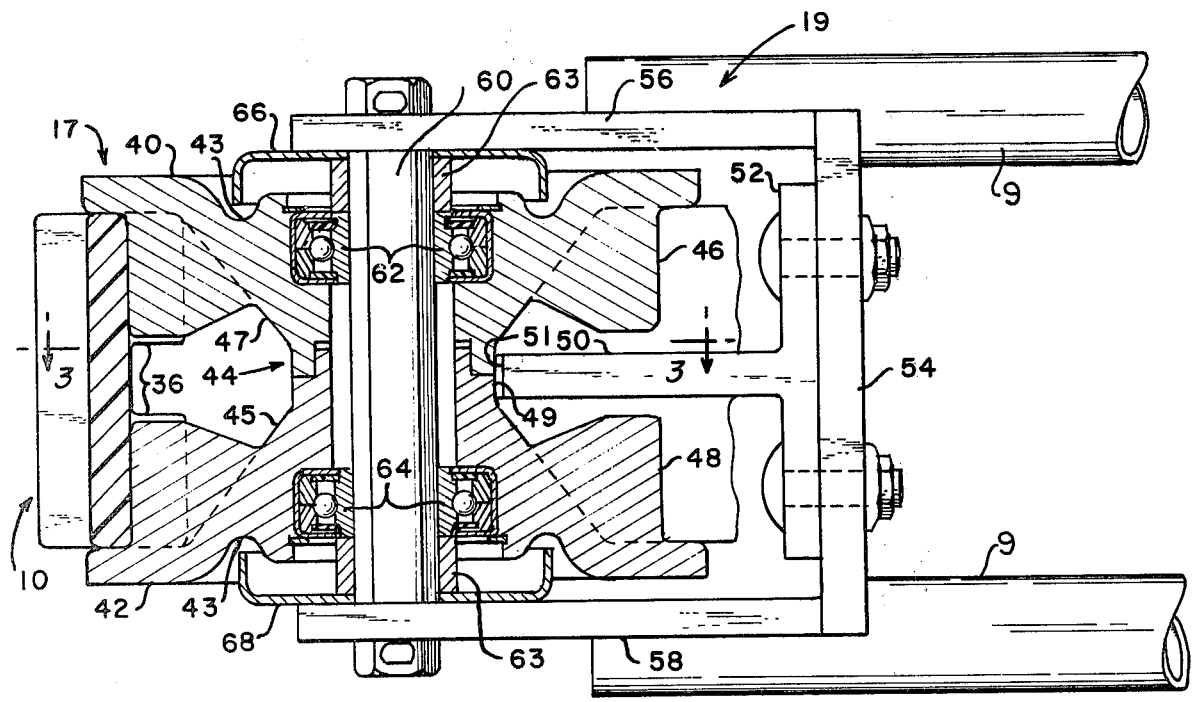
FIG. 2 is a side elevation view of a portion of the apparatus of FIG. 1 and shows the details of one of the sprocket assemblies thereof, the sprocket gear being shown in center cross-section.

FIG. 2 illustrates idler sprocket 17 in greater detail. The figure shows the mechanism in side elevation with the sprocket 17 itself being shown in center cross-section. Clevis 19 is comprised of a crossmember 54 having two side arms 56 and 58 rigidly secured thereto or integrally formed therewith and extending from the crossmember in substantially horizontal fashion. Supported between side arms 56 and 58 is a stationary hexagonal shaft 60. The latter is secured between the arms by conventional means such as, for example, by bolt fastening means, while clevis 19 is mounted on machine frame 8 by adjustable support tubes 9.

In accordance with the invention there is provided a rotatable sprocket member including a central hub which is peripherally contoured so as to include a middle section of reduced diameter. As herein embodied, the rotatable member comprises the sprocket 17 including a pair of parallel, disk-like sidewalls 40 and 42 which are interconnected by a central hub member generally designated by numeral 44. Hub 44 is mounted for rotation on stationary shaft 60 by a set of ball bearings 62, 64. The peripheral contour of the hub includes a midportion or middle section 49 which is of reduced diameter and further includes a pair of flared or conically shaped sections 45 and 47 of increasing diameter flaring away from middle section 49 toward sidewalls 40 and 42.

Further in accordance with the invention means are provided for enabling driving engagement between the rotatable sprocket member and the drive belt 10. As herein embodied, such means include a set of drive lugs or tangs 46 spaced about a circular path at equal intervals on the inner surface of upper sidewall 40. Similarly, a matching set of drive lugs or tangs 48 are provided on the inner surface of lower sidewall 42. The drive lugs 46, 48 are arranged to cooperate with the inside lugs 36 of belt 10 and to that end each lug 46 is positioned directly above and in vertical alignment with the corresponding lug 48 of the lower set of drive lugs.

As further shown in FIG. 2, the drive lugs or teeth 36 of belt 10 are arranged in two rows with a center gap between them. This allows more space in the center section of the sprocket assembly for the collection of foreign material and facilitates the disintegration and ejection of such material from the mechanism, as described below.

In accordance with a further aspect of the invention, means are provided for wiping or cleaning accumulated foreign matter out of the sprocket assembly. As shown in the present embodiment, the wiping means comprise a stationary wiper arm 50 mounted on crossmember 54 of clevis 19. Arm 50 projects into the space between the sidewalls 40 and 42 and between the two sets of drive lugs 46 and 48, terminating in an end portion 51 which is separated by a narrow gap from the middle section 49 of the hub member 44. Arm 50 is attached to a mounting plate 52 and the latter is secured in a conventional manner, such as through the use of bolt fasteners, to the crossmember 54 of clevis 19.

Figure 3:
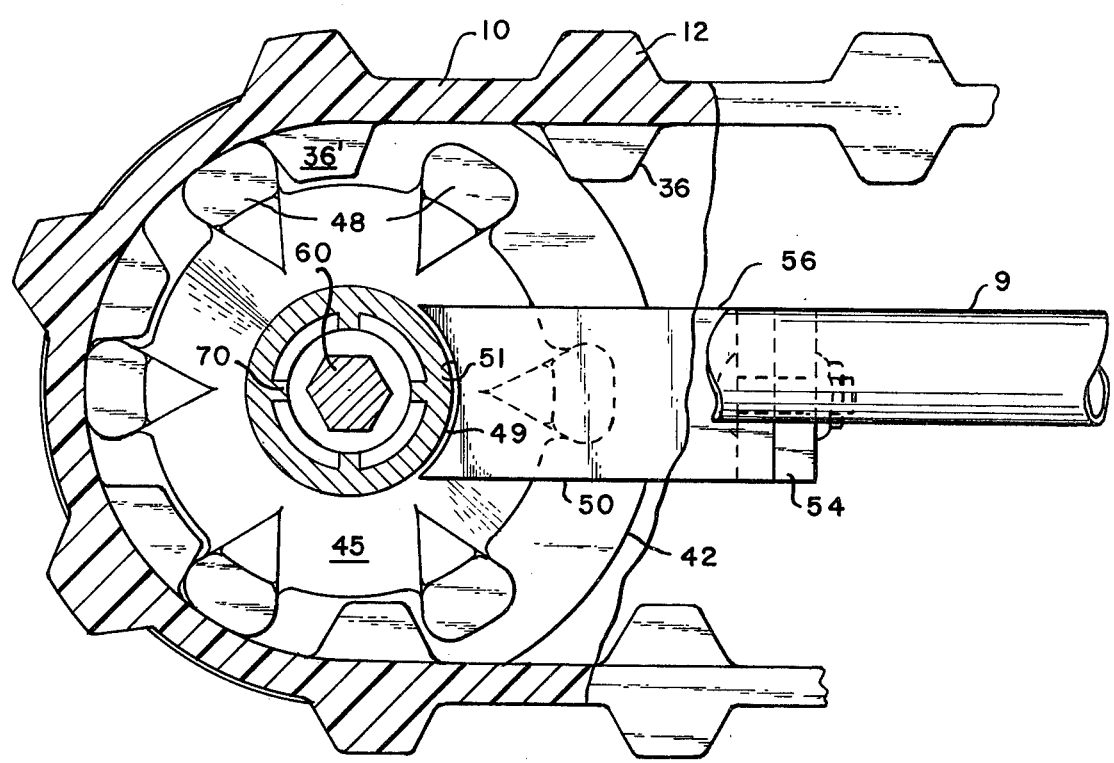
FIG. 3 is a cross-section taken along the line 3—3 of FIG. 2 and shows the bottom half of the sprocket gear and its interrelation with the wiper arm.

As further shown in the plan, cross-section view of FIG. 3, wiper arm 50 is of substantially the same width as the clevis side arms 56 and 58 and the end portion 51 of the wiper arm has an arcuate contour substantially conforming to the contour of the middle section 49 of the sprocket hub. As can also be seen in FIG. 3, the drive lugs or tangs 48 are spaced at equal intervals in a circular path about the center axis of the hub. Six drive lugs are shown but it is to be understood that any number and arrangement of drive lugs may be used to suit particular individual applications.

Referring back to FIG. 2, there is shown a pair of end caps 66 and 68 supported on shaft 60 and arranged to cooperate with a pair of annular grooves 43 provided in the outer surfaces of sidewalls 40 and 42. The end caps serve to close off the openings in the ends of the central hub member and thus protect the bearings 62, 64 against foreign material.

Figure 4:
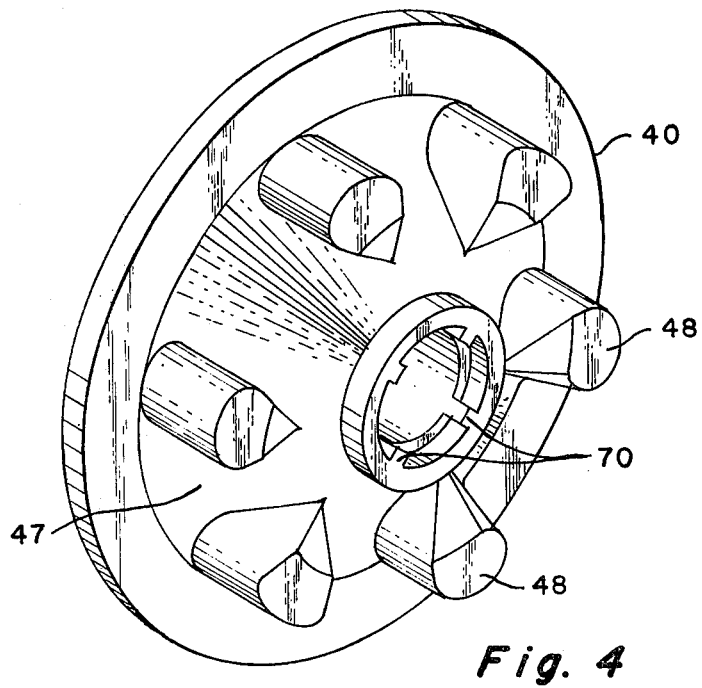
FIG. 4 is a perspective view of one of the sprocket gear halves.

For ease of manufacture it can be appreciated that the sprocket assembly may be fabricated from two substantially similar halves. FIG. 4 illustrates one such half in perspective. Any suitable manufacturing process, e.g., casting, may be employed to form the two halves. FIG. 4 shows the upper sprocket half (as viewed in FIG. 2). It is noted that the central portion of the hub is provided with four tangs 70 (FIG. 4). These tangs are arranged to mate with four complementary slots provided in the corresponding portion of the other sprocket half such that the two halves, when assembled, are prevented from rotating relative to one another. A pair of bushings or spacers 63 (FIG. 2) act to contain the sprocket halves in the axial direction during operation.

It is to be understood that the above-described manufacturing and assembly details including tangs 70 and spacers 63 are merely illustrative of the type of construction details that may be employed. One of ordinary skill would be capable of devising other suitable arrangements.

OPERATION

In operation, the self-cleaning sprocket assembly of the invention, by virtue of the relatively large, open space surrounding its center section, provides an area where foreign material such as grass cuttings, crop cutting and residue, etc., can readily accumulate as the sprocket rotates. Wiper arm 50 breaks up the accumulated material and ejects it from the assembly. As foreign material accumulates in the open center section of the sprocket, the flared conical surfaces 45 and 47 of the central hub generate a camming action or force which tends to channel the material toward middle section 49. This enables the single, relatively narrow (FIG. 2) wiper arm 50 to provide a cleaning or wiping action which breaks up and ejects all of the foreign material which enters the sprocket.

It will be apparent to those skilled in the art that changes in the form and details of the above-described preferred embodiment may be effected without departing from the true spirit and scope of the invention. For example, drive lugs 46 and 48 might in some instances be arranged in staggered fashion rather than in vertical alignment with one another. Furthermore, it is apparent that the drive lugs, instead of being partially formed on the tapered sections 45 and 47 of the hub and partially formed on the inner surfaces of the sprocket sidewalls 40 and 42, as shown herein, may be supported entirely on either one or the other of such surfaces. Further, while the above illustrated embodiment is constructed as an idler sprocket mounted on a stationary shaft, it is to be appreciated that the same sprocket design may be used for a drive sprocket where the central hub is rigidly fixed by a key or splines to the center shaft, the latter being connected to a source of drive power. Such would be the construction used for drive sprockets 14 and 15 shown in FIG. 1.

What is claimed is:

1. In a crop handling device having a flexible, toothed driving member exposed to the crop, the improvement comprising:
    a self-cleaning sprocket assembly adapted for rotational cooperation with the driving member, the sprocket assembly including a rotatable member including a pair of spaced parallel sidewalls interconnected by a central hub, the surface of said hub being contoured so as to include a middle section of reduced diameter and additional sections of generally conical configuration extending away from said middle section toward said sidewalls, said sidewalls being spaced apart by a distance slightly greater than the width of said driving member so that the latter is constrained between said sidewalls during engagement with said sprocket assembly;
    mounting means supporting said rotatable member for rotation about an axis passing through said hub; and
    a plurality of drive lugs projecting from the inner surfaces of said sidewalls and arranged to cooperate with the teeth of said driving member, said lugs being arranged in two sets spaced apart axially to form a gap, the latter being disposed in substantial alignment with said middle section, said driving lugs each including an outer bearing surface which engages the inner surface of said driving member.

2. The sprocket assembly set forth in claim 1 further comprising:
    wiping means mounted adjacent to said rotatable member and including an arm extending into said gap between said lugs and terminating in an end portion positioned in close proximity to the middle section of said central hub, whereby rotation of said rotatable member operates to cause foreign material carried into said sprocket assembly to be channelled by said conical sections of said hub toward the middle section thereof, thereupon to be ejected from said assembly by the wiping action of said wiping means.

3. The sprocket assembly set forth in claim 1 wherein said plurality of drive lugs comprises a first set of lugs projecting from one of said sidewalls at evenly spaced intervals on a first circular path centered about said axis and a second set of lugs projecting from the other of said sidewalls at evenly spaced intervals on a second circular path centered about said axis.

4. The sprocket assembly set forth in claim 3 wherein the lugs of said first and second sets are arranged in mutually opposed pairs, the lugs of each said pair being centered about a plane passing through the axis of rotation of said rotatable member.

5. The sprocket assembly set forth in claim 2 wherein said mounting means comprises:
    a clevis including a crossmember and a pair of side arms extending from said crossmember;
    a shaft supported between said side arms in coaxial alignment with said axis of rotation; and
    means for connecting said central hub to said shaft to permit rotation of said hub about said axis.

6. The sprocket assembly set forth in claim 5 further comprising:
    means for securing said wiping means to said crossmember of said clevis.

7. The sprocket assembly set forth in claim 1 wherein said rotatable member is constructed of two substantially similar halves joined together in mating engagement along a plane which is perpendicular to said axis and which passes through the center of said middle section of said hub.

8. The sprocket assembly set forth in claim 1 wherein said mounting means includes a stationary shaft supported along said axis and a set of bearings arranged to support said rotatable member for rotation about said shaft.

9. The sprocket assembly set forth in claim 8 further comprising:
    an annular groove provided in the outer surface of each of said sidewalls; and
    a pair of circular end caps mounted on said stationary shaft, one of said end caps being adjacent the outer surface of each of said sidewalls and including side portions extending into the annular groove in said sidewall whereby said bearings are protected from exposure to foreign material.

10. The sprocket assembly set forth in claim 2 wherein said middle section of said hub surface is cylindrically shaped and the end portion of said arm of said wiping means is configured as a section of a cylinder which is substantially concentric with respect to said middle section.

11. In a crop handling device having a flexible, toothed driving member exposed to the crop, the improvement comprising:
- a self-cleaning sprocket assembly adapted for rotational cooperation with the driving member, the sprocket assembly including a rotatable member including a pair of sidewalls interconnected by a central hub, the surface of said hub being contoured so as to include a middle section of reduced diameter and additional sections of generally conical configuration extending away from said middle section toward said sidewalls;
- mounting means supporting said rotatable member for rotation about an axis passing through said hub; and
- a plurality of drive lugs projecting from the inner surfaces of said sidewalls and arranged to cooperate with the teeth of said driving member, said lugs being arranged in two sets spaced apart axially to form a gap, the latter being disposed in substantial alignment with said middle section, said lugs each including an outer bearing surface arranged to engage the inner surface of said driving member and side surfaces, one of which is adapted to cooperate with a tooth on said driving member, said side surfaces having inwardly tapering sections to provide clearance to allow foreign material carried into said sprocket to move away from said driving member toward said middle section of said hub.

12. The sprocket assembly set forth in claim 11 wherein said sidewalls are spaced apart by a distance slightly greater than the width of said driving member so that the latter is constrained between said sidewalls during engagement with said sprocket assembly.

13. In a crop handling device having a flexible, endless driving member exposed to the crop, the improvement comprising:
- a rotary member adapted for rotational cooperation with the driving member, the rotary member including a hub mounted for rotation about an axis, the contour of said hub including an outer peripheral surface of rotation about said axis with the midportion of said surface being of reduced diameter, said contour additionally including sections of increasing diameter flaring away from said midportion;
- a plurality of drive lugs projecting inwardly from said hub and each including an outer bearing surface arranged to cooperate with said driving member; and
- parallel sidewalls afixed to said hub and spaced apart by a distance slightly greater than the width of said driving member so that the latter is constrained between said sidewalls during engagement with said rotary member.

14. In a crop handling device having a flexible, endless driving member exposed to the crop, the improvement comprising:
- a rotary member adapted for rotational cooperation with the driving member, the rotary member including a hub mounted for rotation about an axis, the contour of said hub including an outer peripheral surface of rotation about said axis with the midportion of said surface being of reduced diameter, said contour additionally including sections of increasing diameter flaring away from said midportion;
- a plurality of drive lugs projecting inwardly from said hub and arranged to cooperate with said driving member; and
- said lugs including an outer surface arranged to engage the inner surface of said driving member and further including side surfaces having inwardly tapering sections to provide clearance to allow foreign material carried into said rotary member to move away from said driving member toward said midportion of said hub.

* * * * *